United States Patent
Lo et al.

(10) Patent No.: US 8,930,732 B2
(45) Date of Patent: Jan. 6, 2015

(54) FAST SPEED COMPUTER SYSTEM POWER-ON AND POWER-OFF METHOD

(75) Inventors: Shi-Wu Lo, Chia-Yi (TW); Wel-Sheng Tsai, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 526 days.

(21) Appl. No.: 12/579,022

(22) Filed: Oct. 14, 2009

(65) Prior Publication Data

US 2011/0087901 A1    Apr. 14, 2011

(51) Int. Cl.
*G06F 1/32*    (2006.01)
*G06F 1/26*    (2006.01)
*G06F 9/44*    (2006.01)
*G06F 11/14*    (2006.01)

(52) U.S. Cl.
CPC .............. *G06F 1/26* (2013.01); *G06F 1/3203* (2013.01); *G06F 9/4418* (2013.01); *G06F 11/1441* (2013.01)
USPC .......................................... 713/320; 713/300

(58) Field of Classification Search
USPC .......................... 713/1, 2, 300, 320, 323, 324
See application file for complete search history.

(56) References Cited

U.S. PATENT DOCUMENTS

| | | |
|---|---|---|
| 6,393,584 B1 * | 5/2002 | McLaren et al. ................. 714/14 |
| 2003/0131206 A1 * | 7/2003 | Atkinson et al. .............. 711/156 |
| 2005/0044332 A1 * | 2/2005 | de Brebisson ................ 711/162 |
| 2007/0288687 A1 * | 12/2007 | Panabaker .................... 711/103 |

* cited by examiner

*Primary Examiner* — Paul Yanchus, III
(74) *Attorney, Agent, or Firm* — Ming Chow; Sinorica, LLC

(57) ABSTRACT

A fast speed computer system power-on & power-off method, that is used to reduce an amount of main memory transferred and stored from a main memory into a second storage device, thus speeding up a speed of re-activation of a computer system from a hibernation state into a full speed operation state. Said fast speed computer system power-on & power-off method is applicable to various types of computer systems, and can be used to write in and load back data in cooperation with a random access processing technology. In addition, said method can be used to reduce extent of data loss and damage of said computer system due to a sudden power outage of said computer system.

6 Claims, 2 Drawing Sheets

FAST SPEED COMPUTER SYSTEM POWER-ON AND POWER-OFF METHOD

BACKGROUND OF THE INVENTION

1. Field of the Invention

The present invention relates to a computer system power-on & power-off method, and in particular to a fast speed computer system power-on and power-off method, that is applicable when a computer system enters into a power saving mode.

2. The Prior Arts

In general, an ordinary operation state of a computer system includes a power saving mode, in addition to a normal mode implementing the operation system and various application programs. The purpose of computer system entering into hibernation is to save energy consumption on one hand, and to reduce noise of system operation on the other hand.

According to a design classification of an Advanced Configuration & Power Interface (ACPI), there are two types of hibernation for a computer system: one of them is a Suspend-To-RAM (STR) state, also referred to as an S3 state, and the other is a Spend-To-Disk (STD) state, also referred to as an S4 state. In the S3 state, the computer system only continues to provide power to a portion of volatile memory, including Frame Buffers, Main Memory, etc., and shut down power to the rest portions. There are two advantages for the S3 state: one of them is that it would be faster for the computer system to return to full speed operation; the other is for better security, when a user is operating on private and confidential data and do not want the data to be stored into a hard disk, an S3 state is utilized. The other type of hibernation is a Spend-To-Disk (STD) state, also referred to as an S4 state. In an S4 state, the data in operation are all written into a non-volatile memory for storage, and then the whole computer system is powered off, thus the advantage of S4 state is that it is more power saving.

However, the efficacy and performance of above-mentioned state S3 and state S4 of hibernation are not quite satisfactory. Since when a computer system enters into an S3 state, power still has to be provided to the volatile memory in the computer system in order to maintain a system storage state. In case that an S4 state is adopted, though it is more power saving than an S3 state, but the speed with which the computer system returns to full speed operation is much slower than that of the S3 state.

In view of the problems and shortcomings of the prior art, the present invention discloses a fast speed computer system power-on & power-off method, such that when a computer system enters into hibernation, the memory utilized can be reduced, thus raising the reaction speed and efficiency for the computer system to be re-activated into full speed operation.

SUMMARY OF THE INVENTION

A major objective of the present invention is to provide a fast speed computer system power-on and power-off method, such that when the computer system enters into hibernation, the amount of memory utilized in the system can be drastically reduced, so as to reduce the amount of data transferred from the main memory to a secondary storage device, thus increasing the speed of computer system returning to full speed operation.

Another objective of the present invention is to provide a fast speed computer system power-on and power-off method, such that the extent of data loss and damage can be reduced during accidental power outage of the computer system.

A further objective of the present invention is to provide a fast speed computer system power-on and power-off method, wherein, data write-in and data retrieval are carried out in a random access manner, so as to greatly increase the data access speed when the computer system enters into hibernation or be re-activated into full speed operation.

To achieve the above-mentioned objective, the present invention provides a fast speed computer system power-on and power-off method, such that when a computer system enters into hibernation, at least a part of the main memory contained therein is classified into a plurality of clean pages and a plurality of dirty pages, the clean pages are swapped out and are abandoned storage, and the dirty pages are written into a hibernation file and are stored into a swap space and a file system of at least a secondary storage device. Therefore, when the computer system is reactivated, these dirty pages are reloaded from the swap space and a file system back into the hibernation file and then back to the main memory, thus the computer system is able to read the data required from the secondary storage device, and then load it back into the main memory. As such, the computer system may reduce the amount of data transferred and stored into the secondary storage device from the main memory, in speeding up the computer system re-activation and returning to full operation speed.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
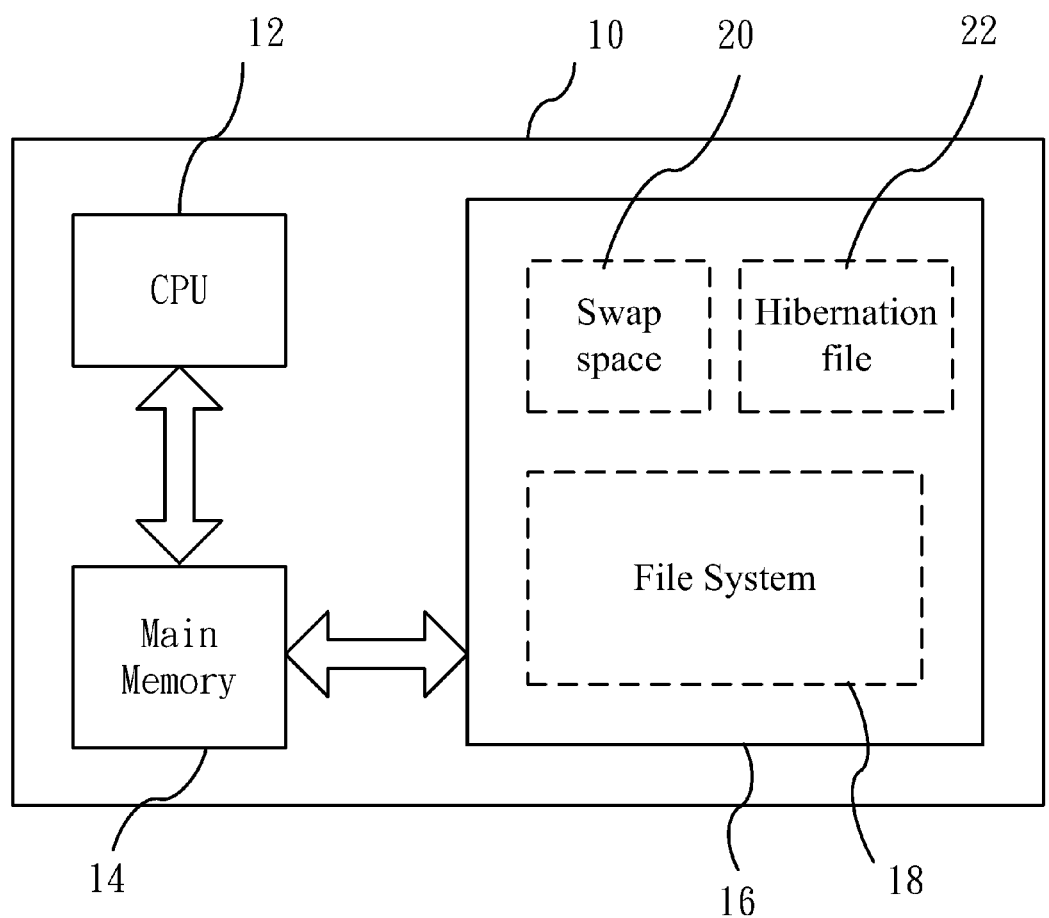
FIG. 1 is a schematic diagram of a fast speed computer system power-on and power-off device according to the present invention.

In the present invention, a fast speed computer system power-on and power-off method is proposed, such that the amount of memory utilized is reduced when the computer system enters into hibernation, hereby decreasing the amount of data written into the secondary storage device, and increasing the speed of the computer system entering into hibernation or being re-activated and restored into full speed operation. In the following, preferred embodiments are described in order to explain the technical characteristics of the present invention. Firstly, refer to FIG. 1 for a schematic diagram of a fast speed computer system power-on and power-off device of the present invention. As shown in FIG. 1, a computer system 10 comprises a Central Processing Unit (CPU) 12, a main memory 14, and a secondary storage device 16. The secondary storage device 16 can be a high speed Random Access Memory (RAM) device, such as a flash memory, and is mainly utilized for a file system 18, a swap space 20, and a hibernation file 22.

Figure 2:
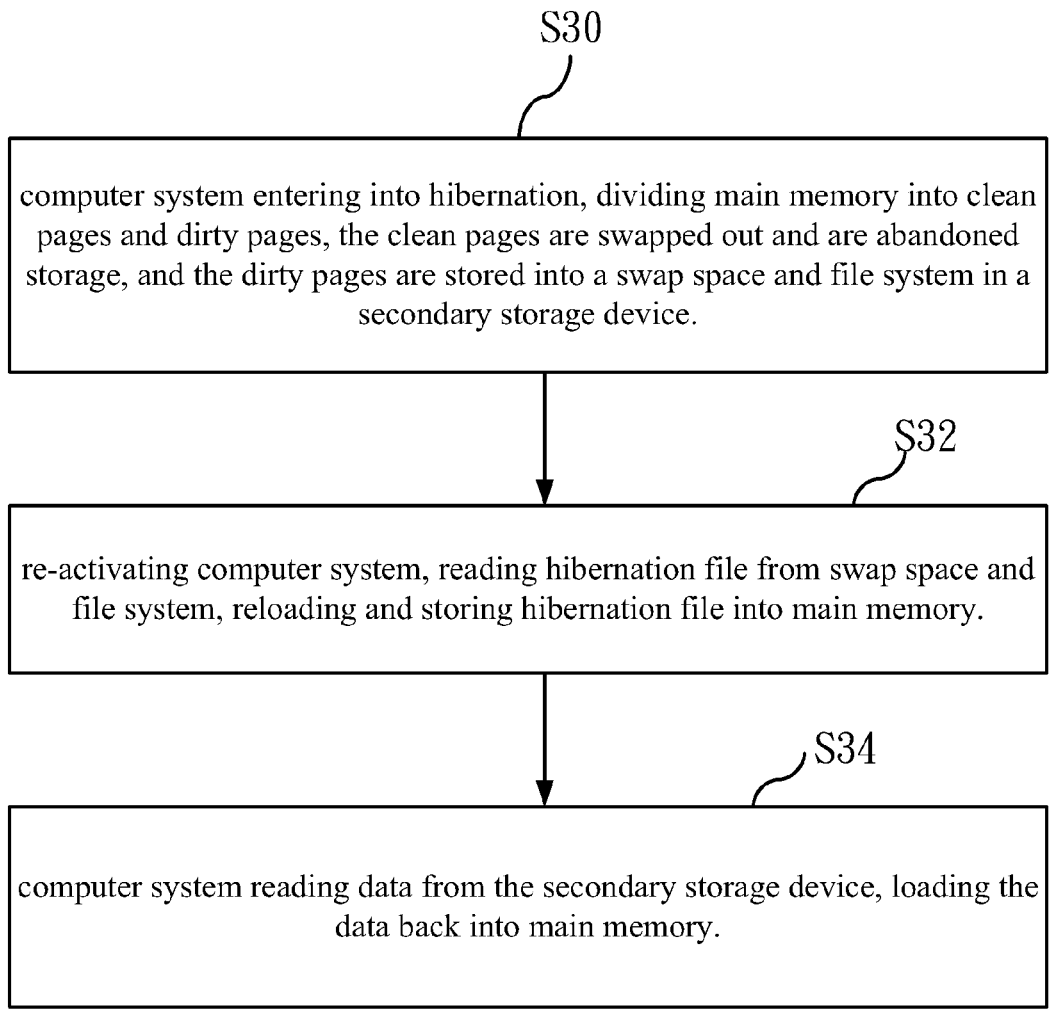
FIG. 2 is a flowchart of the steps of a fast speed computer system power-on and power-off method according to the present invention.

Next, refer to FIG. 2 for a flowchart of the steps of a fast speed computer system power-on and power-off method of the present invention, meanwhile, refer to FIG. 1. As shown in FIG. 2, firstly, as shown in step S30, the Operation System (OS) of the computer system 10 enters into a hibernation mode, and divides the main memory 14 into clean pages and dirty pages using section or page as a unit. Since in the secondary storage device 16 is stored a copy with its contents exactly the same as the clean pages, therefore, the swapped out clean pages will be abandoned storage. Thus, a kernel function is used to allocate the main memory 14 and control the swapping out of the clean pages. The kernel function may allocate the main memory 14 based on the amount of clean pages required to be swapped out, and will release the main memory after the swapping out of the clean pages. The dirty pages in a machine status are stored in a hibernation file 22, and then are stored into a swap space 20 and a file system 18 of a secondary storage device 16. Wherein, the dirty pages can be sorted according to their addresses, and dirty pages of consecutive addresses can be merged into a single write instruction. Then, as shown in step S32, when the computer system 10 is re-activated, the computer system 10 will read from swap space 20 and file system 18 the hibernation file 22, and restore the hibernation file back to the main memory 14, so as to restore the system state. Finally, as shown in step S34, the computer system 10 will read data from the secondary storage device 16 and load it back to the main memory 14.

The speed with which the computer system executes the Suspend-To-Flash function and stops sending data to the secondary storage device 16, such as a flash memory, mainly depends on the amount of data required to be written into the non-volatile memory. The Swapping-Before-Hibernating is executed by the Operation System (OS) through an existing memory management technology contained therein, such that most of the memory pages are abandoned directly without doing any write-in actions, thus it may increase the suspend speed. Upon executing a Resume function, data can be retrieved back from three locations respectively: the hibernation file 22, the swap space 20, and the file system 18. The major data and code of the system belonging to kernel will be retrieved back immediately upon re-activation of the computer system, the remaining data is retrieved back in a paging-on-demand manner for the portion that the users require at the present stage. Since the amount of data required by the user usually is much less than the amount of all the data in the main memory before the suspension of the system, therefore, the resume speed can be increased.

In general, memory page can be classified into three categories respectively as follows: free page, anonymous page, and named page. Wherein, the free pages are the memory presently not utilized by the system, thus the contents in free pages are meaningless to the system. The anonymous pages are the memory dynamically allocated during the execution of program, this part of memory mainly includes: stack and heap. The named page is a copy of the file in the main memory 14, and its behavior resembles to that of cache memory in the secondary storage device 16. The named page mainly includes: an executable file and a dynamic-linked library corresponding to certain locations in the memory, or a program utilize a memory-mapped file for mapping a file to memory.

The anonymous pages and named pages may both be clean pages or dirty pages. When a dirty anonymous page is swapped out, it must be written into a swap space 20, and the dirty named page is swapped out into the file system 18. When the operation system (OS) needs to swap out a clean page, since this page must have a copy of exactly the same contents as in the secondary storage device 16, therefore, the operation system (OS) may abandon the page directly.

When the system starts to execute a Suspend-To-Flash, most of the pages need not be written back into the secondary storage device 16, that is because most of the pages are clean pages. Part of the pages have to be written back to swap space 20 and file system 18, and the remaining pages are non-swappable memory, these pages mainly are the kernel of the operation system or some of the pages are set by the program as non-swappable for performance reasons. The non-swappable memory will finally be written into a hibernation file 22.

When re-starting the computer system, upon finishing the routine hardware initialization and loading in OS loader, the system will determine whether it will return from the hibernation state to a normal state, or whether it will execute the ordinary power-on procedure. In the former case, data in the hibernation file 22 will first be loaded into the main memory 14. Upon finishing this action, the OS has completed the basic power-on procedure. Then, depending on user requirement, the computer system will load the data in the file system 18 and swap space 20 back into the main memory 14 and return to the original system state. In case that the Swapping-Before-Hibernating function is required to be executed again, since at this time part of the dirty pages have been written into the swap space 20 during the execution of the Swapping-Before-Hibernating function last time, such that these pages become clean pages, thus CPU 12 will not perform write-in action for these pages, therefore, these pages need not be written into swap space 20 again. As such, after the second time, the execution speed of the Swapping-Before-Hibernating function can be faster.

The flash memory serving as the secondary storage device 16 is capable of having performance close to the sequential access in random access through utilizing an optimization technology. Through a Write-Combining function, the small random-writes incurred during memory pages swap out are queued before they are actually written into the flash memory, and these pages are first sorted according to their physical addresses, then it can be known that if continuous range write-outs exist in these swapped out pages. In case that the answer is affirmative, then a large write-request action is used to replace a plurality of small write-request actions, hereby increasing the speed of the Swapping-Before-Hibernating function.

In the process of writing the swappable pages into the secondary storage device 16, large amount memory can be requested through the Operation System (OS), so as to avoid that the optimization action of OS in allocating main memory would affect the amount of memory actually allocated. Therefore, once a page is allocated, a data byte is written into that page in forcing OS into allocating physical memory immediately to that program. Through this compulsory action, the OS is forced to swap out a large portion of memory. Subsequently, execute a series of free actions to return all the memory requested and obtained from the system back to OS. Through the implementation of the two steps mentioned above, most of the pages in the operation system (OS) will become free pages, and these free pages need not be written back to the hibernation file 22.

In addition, request can be made directly in kernel of Operation System (OS) to allocate memory, such that the pages required can be allocated immediately through a kernel function, without having to require additional write-in actions in forcing OS into actually allocating memory. Upon finishing allocation of memory, a free action is performed immediately, such that the system will generate large amount of free pages. Since memory allocation is done through a kernel function, thus no additional write-in actions are required. Therefore, the number of pages swapped out can be calculated and obtained in advance, thus it can be figured out how much memory is required to be allocated.

Furthermore, a swapper mechanism in Operation System (OS) can be manipulated directly in allocating the memory required. In this case, a Linux Operation System (OS) is taken as an example, and in its kernel is provided with a memory management function, namely, a Shrink_All_Memory function. This function is utilized to retrieve memory pages, and upon being called, it may load in the amount of pages to be retrieved, thus memory pages can be freed and released without affecting the stability of the system and the programs used by the users. The mechanism of Shrink_All_Memory function is realized through two Least-Recently-Used (LRU) lists in the kernel: an active list and an inactive list. Wherein, the active list includes the pages most recently accessed, and the inactive list includes the pages that have not been accessed for a certain period of time. In actual application, Shrink_All_Memory function will first start to retrieve pages from the inactive list, and then start to retrieve pages from the active list. Therefore, through the application of Shrink_All_Memory function, pages can be swapped out as required without affecting the operation of kernel of the system and the programs used by the users.

From the viewpoint of the kernel in a Linux Operation System (OS), the secondary storage device 16 is considered as an ordinary block Input/Output device, and the parameters received by a Submit_Bio function that is called upon when memory pages are swapped out into a swap space 20 includes: sector number, read/write instruction, memory address, and memory length, etc, such that the pages to be swapped out can be further processed by intercepting a Submit_Bio function.

As mentioned above, The pages to be swapped out are determined by a Shrink_All_Memory function as based on the utilization status of the page and not on its physical address in the main memory 14. In application, we first queue the write requests generated by the Shrink_All_Memory function, and then sort these pages according to their physical memory address, so as to reduce the input/output access numbers and increase the input/output request size. The larger the request size, the better the write-in performance of the flash memory serving as a secondary storage device 16. When a memory page is swapped out, the kernel has to record the location of the page in a swap space 20, such that the kernel may reload this page from the secondary storage device 16 into the main memory 24. Since the write-combining function will rewrite the Shrink_All_Memory function, such that each time after the execution of the Shrink_All_Memory function, the location of each written-in page in the swap space 20 must be certified, then this information is put into the swapped-out page identifier in the page table.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A fast speed computer system power-on & power-off method, comprising the following steps:
   when a computer system having a secondary storage with fast random access enters into a hibernation, said computer system partitions a main memory into a plurality of clean pages and a plurality of dirty pages, said clean pages are swapped out without I/O access, and said dirty pages are written into a hibernation file or stored in a swap space or stored in a file system of at least a second storage device which is a high speed random access nonvolatile memory device,
   when said computer system is re-activated, said computer system reads said hibernation file from said swap space and said file system, and restores and stores said hibernation file into said main memory;
   said computer system reads data from said second storage device through random access, and loads said data into said main memory;
   in said step of said computer system entering into said hibernation, said main memory is provided with a kernel function, and that is used to control swapping out of said pages, and after the completion of said pages swapping out release said main memory; and
   said kernel function is able to calculate a number of said clean pages and said dirty pages to be swapped out, and free said main memory based on said number of said clean pages and said dirty pages.

2. The fast speed computer system power-on & power-off method as claimed in claim 1, wherein
   in said step of said computer system entering into said hibernation, after said clean pages are swapped out, said main memory is released.

3. The fast speed computer system power-on & power-off method as claimed in claim 1, wherein
   said secondary storage device is a flash memory.

4. The fast speed computer system power-on & power-off method as claimed in claim 1, wherein
   in said step of said computer system entering into said hibernation, said computer system utilizes section as a unit in partitioning said main memory.

5. The fast speed computer system power-on & power-off method as claimed in claim 1, wherein
   said secondary storage device is provided with a copy having its contents the same as those of said clean page.

6. The fast speed computer system power-on & power-off method as claimed in claim 1, wherein
   in said step of said computer system entering into said hibernation, said swapped out dirty pages are sorted according to their addresses, and said dirty pages of consecutive addresses are merged into a single write-in function, and writing-combing to said secondary storage device.

* * * * *